United States Patent
Tashiro et al.

[15] 3,676,418
[45] July 11, 1972

[54] CATALYTIC PRODUCTION OF OLEFIN POLYMERS

[72] Inventors: Kijuro Tashiro; Masuzo Yokoyama, both of Inashiki-gun, Ibaraki-ken, Japan

[73] Assignee: Mitsubishi Petrochemical Co., Ltd., Tokyo-to, Japan

[22] Filed: July 16, 1969

[21] Appl. No.: 842,386

[30] Foreign Application Priority Data

July 20, 1968 Japan.....................................43/50907

[52] U.S. Cl..........................260/88.2, 252/429 B, 260/93.7, 260/94.9 C, 260/94.9 E
[51] Int. Cl..........................................C08f 1/56, C08f 3/10
[58] Field of Search ................252/429 B; 260/93.7, 94.9 C, 260/94.9 E

[56] References Cited

UNITED STATES PATENTS

| | | | |
|---|---|---|---|
| 2,920,062 | 1/1960 | McFarland | 260/94.9 |
| 3,058,970 | 10/1962 | Rust et al. | 260/93.7 |
| 3,173,901 | 3/1965 | Newberg et al. | 260/94.9 |
| 3,271,376 | 9/1966 | Achon et al. | 260/93.7 |
| 3,328,375 | 6/1967 | Price | 260/93.7 |
| 3,440,179 | 4/1969 | Bayer et al. | 260/93.7 |
| 3,506,591 | 4/1970 | Hague et al. | 252/429 |

FOREIGN PATENTS OR APPLICATIONS

| | | |
|---|---|---|
| 1,490,233 | 6/1967 | France |
| 828,201 | 2/1960 | Great Britain |
| 954,609 | 4/1964 | Great Britain |

*Primary Examiner*—Joseph L. Schofer
*Assistant Examiner*—Edward J. Smith
*Attorney*—Robert E. Burns and Emmanuel J. Lobato

[57] ABSTRACT

A Ziegler-type polymerization catalyst comprising a first catalyst component containing a transition metal compound and a second catalyst component containing an organometallic compound, which first catalyst component contains a silicon compound. Preparation of the first catalyst component and production of olefin polymers are also disclosed.

6 Claims, No Drawings

3,676,418

CATALYTIC PRODUCTION OF OLEFIN POLYMERS

BACKGROUND OF THE INVENTION

This invention relates generally to the production of crystalline polymers in high yields. More specifically, it relates to a so called Ziegler-type catalyst for the polymerization of olefins and to a process for producing olefin polymers in which the catalyst is employed.

The terms "polymer" and "polymerization" used herein should be construed in this invention to be inclusive of "-copolymer" and "copolymerization", respectively.

A catalyst comprising a compound of a metal selected from Groups IVb, Vb, and VIb and an organometallic compound of a metal selected from Groups I, II, and III is known as a so called Ziegler-type catalyst. Among such catalysts, a combination of a titanium halide as the first catalyst component and an organo-aluminum compound as the second catalyst component is typical, and preferred, in polymerization of α-olefins such as propylene.

As a process for preparing a catalyst comprising such a combination, a process is known in which a compound falling within the class of said first catalyst component is caused to react with a compound falling within the class of said second catalyst component to form a reaction product insoluble in a hydrocarbon, and then the reaction product is combined with a compound falling within the class of the second catalyst component to "make up" a final catalyst. Accordingly, a catalyst produced by the combination of an organo-aluminum compound with a reaction product insoluble in a hydrocarbon which has been produced by the reaction of titanium tetrahalide such as $TiCl_4$ and an organo-aluminum compound is known accordingly.

An improvement in catalyst efficiency is naturally desirable, but the improvement will, in general, result in a production of polymers of inferior properties and characteristics. Accordingly, in general, when the catalyst efficiency is improved, the yield of the stereospecific polymer is lowered, and the characteristics of the polymers produced such as the particle size and distribution thereof the polymer tend to become worse.

SUMMARY OF THE INVENTION

An object of the invention is to provide a method for improving the catalyst efficiency without the accompaniment of the above drawbacks.

A further object of the invention is to provide a novel polymerization catalyst for olefins.

Another object of the invention is to provide a polymerization process in which such a catalyst is employed.

According to the present invention in one aspect thereof, briefly summarized, there is provided a polymerization catalyst for olefins which comprises a combination of 1. a reaction product insoluble in a hydrocarbon of
   a. a compound of a metal selected from Groups IVb, Vb, and VIb of the Periodic Table,
   b. an organometallic compound of a metal selected from Groups I, II, and III of the Periodic Table, and
   c. a silicon compound representable by the general formula $SiX_nY_{4-n}$ wherein X is a halogen, Y is a member selected from the group consisting of hydrogen, alkyl and alkoxyl groups, and $n$ is an integer of from zero to 4, except that $n$ is not zero when Y is hydrogen, with
2. an organometallic compound of a metal selected from Groups I, II, and III of the Periodic Table.

According to the present invention in another aspect thereof, briefly summarized, there is provided a process for preparing said reaction product 1 which comprises causing said compound $a$ to react with said compound $b$ in the presence of said silicon compound $c$.

According to the present invention in still another aspect thereof, briefly summarized, there is provided a process for producing an olefin polymer which comprises causing at least one olefin to contact a catalyst as defined above and thereby to polymerize.

The use according to the present invention of such a Ziegler-type catalyst in which the hydrocarbon insoluble reaction product of the compounds $a$, $b$ and $c$ is substituted for said conventional first component of the catalyst of this type can increase the total polymer yield without excessive decrease in the percentage of the stereospecific polymer in the total polymer. For example, with the use of a catalyst of comprising the reaction product 1 and $AlEt_2Cl$ (Et is an ethyl group), the total polymer yield per gram of $TiCl_3$ is approximately 1.5 times as high as that obtainable by the use of a conventional catalyst of a $TiCl_3$–$AlEt_2Cl$ system. In addition, the particle size of the polymer produced is larger, and the distribution of the size is narrower.

DETAILED DESCRIPTION OF THE INVENTION

The first catalyst component of the invention is prepared from the aforementioned compounds $a$, $b$, and $c$.

As stated hereinbefore, a catalyst which comprises a combination of a reaction product of said compounds $a$ and $b$ with said compound 2 is known, and, accordingly, the improvement according to the invention resides in that the reaction product of compounds $a$ and $b$ is produced in the presence of the compound $c$, a silicon compound representable by the general formula set forth hereinabove.

Accordingly, the compound $a$, namely a compound of a metal selected from Groups IVb, Vb, and VIb, and the compound $b$, namely an organometallic compound of a metal selected from Groups I, II, and III, usable in the preparation of the first catalyst component in combination with the compound $c$ can be those that are usable as starting materials in the preparation of a conventional first catalyst component and are well known. Typical examples of the compound $a$ are titanium halides such as titanium tetrahalide or titanium tetrachloride, in particular, and of the compound $b$ are compounds representable by the formula $AlR_nZ_{3-n}$, wherein R is an alkyl, aryl, aralkyl, alkaryl, or cycloalkyl group, an alkyl group of 1–4 carbon atoms being preferable, Z is a halogen or chlorine, in particular, and $n$ is 1, 1.5, 2 or 3.

The compound $c$ is representable by the formula hereinbefore described, in which formula a typical halogen is chlorine, and an alkyl or alkoxy group is that containing a number of carbon atoms of the order of 4 or less, typical examples thereof are silicon tetrachloride, trichlorosilane, methyltrichlorosilane, ethyltrichlorosilane, dimethyldichlorosilane, trimethylchlorosilane, tetramethylsilane, diethoxydimethylsilane, and methyltriethoxysilane. These are used singly or in admixture.

The proper ratio between the compounds $a$, $b$ and $c$ rests with the preference of the operator.

In general, however, the ratio of the quantities of the compounds $a$ to $b$ is essentially the same as that in the conventional catalyst, and may be in the range of, for example, from 1:1 to 1:12, and the mole ratio of the quantities of the compounds $c$ to $a$ may be in the order of, for example, from 0.03 to 2 expressed in terms of weight ratio relative to $TiCl_4$, thus the mole ratio of compounds $a : b : c$ being 1:1 – 12:0.03–2. The mole ratio of catalyst components 1 : 2 is, in general, 1:0.5 – 20.

The reaction between compounds $a$, $b$ and $c$ can be carried out in any suitable manner which assures homogeneous and complete interreaction of these compounds in an inert atmosphere.

Examples of suitable methods are:

1. Admixing the silicon compound into a solution of $TiCl_4$ in the presence or absence of an inert organic diluent, and then dropping continuously a solution of a dialkylaluminum monohalide into the resulting solution so as to produce a reduction product in which $TiCl_4$ is reduced.
2. Dropping continuously a solution of a mixture of a silicon compound and a dialkylaluminum halide into a solution of $TiCl_4$ in the presence or absence of an inert organic diluent to produce a reduction product.
3. Dropping continuously a solution of dialkyl-aluminum halide into a solution of $TiCl_4$ in the presence or absence of an inert organic diluent, and during the dropwise addition, admixing a silicon compound into the $TiCl_4$ solution so as to produce a reduction product.

4. Dropping continuously a solution of a dialkyl-aluminum monohalide into a solution of $TiCl_4$ in the presence or absence of an inert organic diluent, and then, or upon the completion of the dropping, admixing a silicon compound with the $TiCl_4$ solution so as to produce a reduction product.

5. Process as disclosed in any of the above embodiments wherein a solution of $TiCl_4$ is caused to drop instead of having the compounds b and c drop.

The above "dropping" is carried out continuously at a temperature in the range of from $-30°$ C. to $+20°$ C. for at least 2 hours, and, upon completion thereof, the resulting reaction product is preferably maintained at that temperature for at least 2 hours to complete the reaction of the compounds a, b, and c. The reaction product is, in general, a brown or black solid mass.

The solid mass or reduction reaction product thus produced can be employed immediately as the first catalyst component. In order to obtain a good catalyst for producing stereospecific polymers of α-olefins such as propylene, however, the solid mass as produced is preferably made to undergo some post-treatment.

One of such post-treatments is to cause undesirable organo-aluminum compounds such as ethylaluminum dichloride to be absent from the resultant solid mass, since the presence of this organo-aluminum compound in the solid mass is detrimental to a catalyst of good performance. Accordingly, when the solid mass contains ethylaluminum dichloride as a consequence of the use of diethylaluminum chloride as a reducing agent, the solid mass is preferably washed with an inert organic solvent for the dichloride which is preferably a fresh solvent which has been deaerated and dried.

Another expedient for causing the solid mass to be free of ethylaluminum dichloride is to cause the ethylaluminum dichloride to react with equimolar triethylaluminum to convert it into diethylaluminum chloride.

Another post-treatment for obtaining a catalyst of especially high performance includes a heat treatment. When the solid mass, after having been washed completely, is heated in an inert atmosphere at a temperature in the range of from $60°$ to $200°$ C. or preferably in the range of from $110°$ to $170°$ C. for at least 1 hour, the polymer yield per gram of the solid titanium compound in the "make-up" catalyst is increased, and the productivity of crystalline polymer is also increased.

A polymerization process of α-olefins in which the first catalyst component according to the invention is employed does not differ essentially from a conventional polymerization process such as that disclosed in U.S. Pat. No. 3,058,963 in which a conventional first catalyst component without the compounds c employed. Accordingly, for example, as a second catalyst component an organo-aluminum compound of formula $AlR_nZ_{3-n}$, wherein the definitions for R, Z and n are identical with those hereinbefore described with regard to a preferred compound b, such as triethylaluminum, diethylaluminum chloride, ethylaluminum sesquichloride, di-n-propylaluminum chloride, and diisobutylaluminum chloride may be used.

As a liquid reaction medium, a saturated aliphatic or aromatic hydrocarbon such as hexane, heptane, octane, cyclohexane, benzene, or toluene may be used singly or in an admixture. The polymerization temperature is in the range of from room temperature to $110°$ C., preferably in the range of from $50°$ to $90°$ C.. A molecular weight regulating agent such as hydrogen, or other suitable additives such as benzoate esters can be introduced into the reaction medium or the catalytic system. An α-olefin such as ethylene, propylene, or butene-1, singly or in admixture can be polymerized.

The following examples are set forth merely as further illustrations of the present invention and are not intended to limit the scope thereof.

EXAMPLE 1

1. Preparation of a First Catalyst Component

Into a 1-liter, 3-necked flask purged by nitrogen, 13.1 ml. of $TiCl_4$ was added and 5.0 ml. of $SiCl_4$ was then added. The resulting solution was cooled to $-5°$ C. Into this solution, a solution of 15.0 ml. of $AlEt_2Cl$, mole ratio of Al/Ti being 1, in 50 ml. of heptane was dropped continuously in nitrogen atmosphere for 4 hours, the temperature being maintained at $-5°$ C. A black or brown product insoluble in a hydrocarbon was produced. In order to complete the solid mass-producing reaction, stirring was continued for further 2 hours at that temperature. The resulting slurry was then decanted, and the precipitate was washed with dried heptane 2 times and subjected to a heat treatment. The heat treatment was carried out by means of an oil bath maintained at $155°$ C. in nitrogen atmosphere.

A purple titanium-containing solid product was thus obtained, the yield being approximately 23 g.

2. Polymerization of Propylene

A part of the solid product thus prepared was used as a first component of a polymerization catalyst.

Into a 1-liter stainless-steel autoclave provided with stirring means and temperature controlling means, after several repetitions of evacuation-nitrogen substitution cycle, 400 ml. of heptane, 1.0 g. of $AlEt_2Cl$, and 0.191 g. of the titanium containing solid product were charged, and 200 cm$^3$, measured at ambient, i.e., normal temperature and atmospheric pressure, of hydrogen was also charged. The autoclave was heated to $70°$ C., and thereafter propylene was fed so that the polymerization pressure was maintained constant at 4 kg./cm.$^2$ gauge. The polymerization was continued for 2 hours.

At the end of the polymerization, 100 ml. of butanol was added to the process batch in the autoclave, and the batch was agitated at $70°$ C. for 2 hours. The polymer slurry thus obtained was then filtered, and the resulting polymer cake was dried under vacuum at $70°$ C. for 6 hours. 73.8 g. of a white solid polymer was thus obtained.

The crystalline white polymer thus produced was in the form of powder the particles of which were spherical, and the content of finer particles under 100 mesh thereof was less than 2 percent, the distribution of particle size being narrow.

The polymer was extracted with boiling n-heptane for 6 hours, whereby 3.0 g. of non-crystalline polymer was extracted. The filtrate was evaporated to dryness, and was found to contain 7.7 g. of a non-crystalline polymer.

Thus, approximately 430 g. per gram of the solid titanium containing component of polymer was obtained. The ratio of the fraction insoluble in boiling heptane to the total polymer was 86.9 percent according to the following calculation.

$(73.8 - 3.0)/(73.8 + 7.7) \times 100 (\%) = 86.9\%$

This ratio is hereinafter called "total II."

The melt index (MI) according to ASTM procedure of the white polymer produced was 23.

EXAMPLE 2

1. Preparation of a First Catalyst Component

The procedure of Example 1, 1), was followed.

2. Polymerization of Propylene

The procedure of Example 1, 2), was followed except that the polymerization was carried out in the presence of 0.0170 g. of ethyl benzoate added to the system.

As a result, approximately 460 g. per gram of the solid titanium containing component of a white polymer was obtained. The total II and MI of this polymer were 89.0% and 14, respectively, and the powder characteristics were substantially identical with those of the polymer obtained in Example 1.

Reference Example 1

The procedures of Example 1, 1) and 2), were followed except that reduction of $TiCl_4$ with $AlEt_2Cl$ was carried out without the addition of $SiCl_4$.

Approximately 340 g. per gram of titanium compound used of a white polymer was obtained. The total II and MI of this polymer were 86.8 percent and 23, respectively.

The polymerization in the presence of 0.0350 g. of ethyl benzoate in the catalyst system gave a result in the polymer yield and total II substantially the same as that obtained without ethyl benzoate. Thus, no effect of the addition of ethyl benzoate was found.

Reference Example 2

The procedures of Example 1 were followed except that titanium trichloride (AA grade, manufactured by Toho Titanium Co., Japan) was used as a first catalyst component.

Approximately 300 g. per gram of titanium trichloride (AA) of a white polymer was obtained, the total II and MI of this polymer being 91.4 percent and 10, respectively.

The polymer was sieved, and was found to contain less than approximately 24 percent of finer particles under 100 mesh, the particle size distribution being broad.

The polymerization was repeated, but 0.0350 g. of ethyl benzoate was added to the catalyst system. Approximately 270 g. per gram of titanium trichloride (AA) of a white polymer was obtained, the total II and MI of this polymer being 94.5 percent and 5, respectively.

Now, it will be apparent from a comparison of the results in Examples 1 and 2 and Reference Examples 1 and 2 that the catalyst, a first catalyst component of which is prepared by the reduction of $TiCl_4$ in the presence of $SiCl_4$ added, has, in comparison with the conventional catalysts, an increased catalytic activity without being accompanied by decrease in total II, and that the polymer produced is highly crystalline with improved powder characteristics. Further, the solid titanium containing product is different, in behavior to a total II improving agent such as ethyl benzoate, from $TiCl_3$ (AA grade) or a reduction product of $TiCl_4$ with an organo-aluminum compound without the addition of $SiCl_4$.

The first catalyst component prepared by the reduction of $TiCl_4$ in the presence of $SiCl_4$ not only performs better than conventional ones in polymerization but also exhibits a behavior different from that of a conventional $TiCl_3$ in determination by differential thermal analysis. Thus, it is found that the silicon compound is not present in the solid mass merely as an additive or "physically," but in a form which is somewhat correlative to other constituents of the solid mass, or "chemically."

Examples 3 to 13

The procedures of Example 1 were followed except that different silicon compounds listed in the following table in quantities different from that of $TiCl_4$ were used.

In Example 11, two silicon compounds were used in combination.

What we claim and desire to secure by letters patent is:

1. A process for producing a propylene polymer which comprises contacting a monomer selected from the group consisting of propylene and mixtures of propylene and ethylene with a polymerization catalyst, said polymerization catalyst comprising a combination of:

I. a reaction product insoluble in a hydrocarbon of:
   a. $TiCl_4$,
   b. an organoaluminum compound of the formula:

$$AlR_nZ_{3-n}$$

wherein R is a member selected from the group consisting of alkyl, aryl, aralkyl, alkaryl, and cycloalkyl groups, Z is a halogen, and $n$ is 1, 1.5, or 3, and
   c. a silicon compound of the formula:

$$SiX_nY_{4-n}$$

wherein X is a halogen, Y is a member selected from the group consisting of hydrogen, alkyl and alkoxy and $n$ is an interger of from 0 to 4 except that $n$ is not zero when Y is hydrogen the molar ratio of said compounds $a$, $b$, and $c$ being 1:1 to 12: 0.03 to 2, said reaction having been carried out at a temperature in the range from $-30°$ to $+20°$ C and added to II. an organoaluminum compound of the general formula $$AlR_nZ_{3-n}$$

wherein R is a member selected from the group consisting of alkyl, aryl, aralkyl, alkaryl, and cycloalkyl groups, Z is a halogen and $n$ is 1, 1.5, 2, or 3, the molar ratio of said reaction product I and said compound II being 1:0.5 to 20.

2. A process for producing an olefin polymer as claimed in claim 1 wherein said organoaluminum compound b is represented by the general formula $AlR_2Z_{3-n}$, R being a lower alkyl group and $n$ being 1, 1.5, 2, or 3 and Z is chlorine.

3. A process for producing an olefin polymer as claimed in claim 1 wherein said silicon compound c is represented by the general formula $SiX_nY_{4-n}$, Y being a lower alkyl group and $n$ being a number from 0 to 4 and X is chlorine.

4. A process for producing an olefin polymer as claimed in claim 3 wherein said silicon compound c is $SiCl_4$.

5. A process for producing an olefin polymer as claimed in claim 1 wherein Z in the formula $AlR_nZ_{3-n}$ set forth for organo-aluminum compound (II) represents chlorine.

6. A process for producing an olefin polymer as claimed in claim 1 which includes the step of heating the solid reaction product (I) to a temperature in the range of from $60°$ to $200°$ C for at least 1 hour before it is combined with said organoaluminum compound (II).

| Example Nos. | Preparation of a first catalyst component | | Polymerization | | | |
|---|---|---|---|---|---|---|
| | Si compound | Si compound, $TiCl_4$ wt. ratio | Quantity[1] (g.) | Total II, percent | MI | Bulk density |
| 3 | $Cl_3SiH$ | 0.18 | 400 | 85.8 | 22 | 0.36 |
| 4 | $Cl_3SiH$ | 0.33 | 430 | 87.6 | 22 | 0.32 |
| 5 | $Cl_3SiH$ | 0.59 | 390 | 85.9 | 24 | 0.38 |
| 6 | $Cl_3SiCH_3$ | 0.17 | 430 | 87.5 | 20 | 0.34 |
| 7 | $Cl_3SiCH_3$ | 0.28 | 390 | 85.7 | 24 | 0.32 |
| 8 | $Cl_3SiC_2H_5$ | 0.19 | 380 | 88.6 | 30 | 0.33 |
| 9 | $(CH_3)_4Si$ | 0.14 | 380 | 84.7 | 18 | 0.32 |
| 10 | $ClSi(CH_3)_3$ | 0.11 | 360 | 87.4 | 15 | 0.34 |
| 11 | $(CH_3)_2Si(OC_2H_5)_2$ + $SiCl_4$ | 0.02 / 0.19 | 370 | 88.4 | | 0.37 |
| 12 | $SiCl_4$ | 0.07 | 410 | 87.0 | 15 | 0.42 |
| 13 | $SiCl_4$ | 0.66 | 420 | 84.4 | 16 | 0.38 |

[1] Of a polymer produced per gram of solid Ti-containing product.

* * * * *

UNITED STATES PATENT OFFICE
CERTIFICATE OF CORRECTION

PATENT NO. : 3,676,418
DATED : July 11, 1972
INVENTOR(S) : TASHIRO ET AL

It is certified that error appears in the above-identified patent and that said Letters Patent are hereby corrected as shown below:

In Claim 1, line 12, after "1.5," insert --2--.

Signed and Sealed this

Fifth Day of April 1977

[SEAL]

Attest:

RUTH C. MASON
Attesting Officer

C. MARSHALL DANN
Commissioner of Patents and Trademarks